United States Patent Office 2,988,481
Patented June 13, 1961

2,988,481
COMPOSITIONS OF ALIPHATIC DIBASIC ACID HALF ESTERS OF DICHLORACETYL-PHENYL-PROPANEDIOLS
Walter A. Gregory, Wilmington, Del., assignor to E. I. du Pont de Nemours and Company, Wilmington, Del., a corporation of Delaware
No Drawing. Filed May 2, 1958, Ser. No. 732,442
8 Claims. (Cl. 167—65)

This invention relates to water-soluble, therapeutically active, powdery compositions containing salts of half-esters of dibasic acids with phenylamidopropanediols having a sulfur-containing group attached to the phenyl ring in the para position. The invention is further directed to methods for the prophylaxis and curative treatment of warm blooded animals which are exposed to infectious diseases. The present invention is also directed to flock and herd treatment of infectious diseases of poultry and livestock by administration to the animal of a water-soluble derivative of a phenylamidopropanediol via the animal's drinking water.

The water-soluble compositions of my invention comprise a salt of the following formula (1) 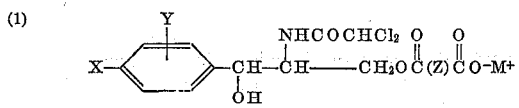

where X is a sulfur-containing group of the class consisting of lower alkylsulfonyl, halogenoalkylsulfonyl containing 1 to 2 carbon atoms, lower alkylsulfinyl, lower alkylmercapto, azidosulfonyl, sulfamyl, mono lower alkylsulfamyl and di lower alkylsulfamyl groups; Y is a member of the class consisting of hydrogen, halogen, lower alkyl and lower alkoxy; Z is a divalent organic radical having from 2 to 10 carbon atoms; and M is a member of the group consisting of ammonium, sodium, potassium, magnesium and calcium.

Salts of Formula 1 in which Z is a saturated or unsaturated divalent aliphatic radical having from two to ten carbon atoms are a preferred group of products of this invention. Also preferred are the compositions containing salts of Formula 1 in which Z is phenyl. Especially preferred are sodium, potassium and calcium salts of Formula 1 in which Z is a saturated or unsaturated divalent aliphatic radical having from 2 to 5 carbon atoms, and in which Y is hydrogen.

The compositions of the invention can be made by several methods. One method which is very satisfactory consists in mixing a compound of the formula (2) 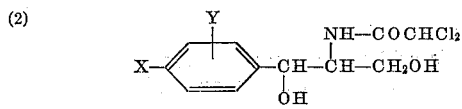

where X and Y have the same significance as in Formula 1, with an anhydride of dibasic acid in a liquid medium. Any tertiary organic base such as for instance trimethylamine, triethylamine, N-methylmorpholine, N-ethylmorpholine, N-methylpiperidine, or quinoline, can be employed as the medium. An especially preferred medium is anhydrous pyridine.

For the preparation of esters of amidopropanediols from the cyclic anhydrides, the Schotten-Baumann method may be employed. For instance, an aqueous NaOH solution containing dimethylformamide may be used to advantage as a medium in which a compound of Formula 2 is reacted with the dibasic acid.

For the preparation of higher dibasic acid esters, that is, esters of dibasic acid which do not readily form cyclic anhydrides, it is preferred to employ a mixture of free dibasic acid and dibasic acid chloride equilibrated in the reaction medium. This mixture is then reacted with the diol of Formula 2.

The sulfur-containing phenyl-2-(alpha,alpha-dichloroacetamido)-1,3-propanediols of Formula 2 are known compounds. Compounds of Formula 2 wherein X is azidosulfonyl are fully described and claimed in U.S. 2,680,120. Compounds of Formula 2 wherein X is sulfamyl, alkylsulfamyl and dialkylsulfamyl are fully described and claimed in U.S. 2,680,135. The lower alkylsulfonyl and the halogenoalkylsulfonyl derivatives of Formula 2 are fully described and claimed in the copending applications of Walter A. Gregory Serial Nos. 257,986, filed November 23, 1951, now abandoned and 418,227, filed March 23, 1954, now abandoned, respectively. The lower alkylmercapto compounds of Formula 2 are fully described by Suter et al. in J. Am. Chem. Soc. 47, 5475 and 75, 4330. The alkylsulfinyl derivatives are prepared by oxidizing the mercapto compound with peracetic acid.

It will be understood that all of the propanediols of Formula 2 may exist in several optical isomeric forms. This invention is concerned primarily with compositions containing the therapeutically active threo enantiomorphs and their racemates. Where no notation appears with a structural formula or with a chemical name the formula or name is to be interpreted in its generic sense. In other words, a formula or name represents not only the unresolved mixture of isomers but also the individual isomers and racemates.

The desired dibasic half ester of the therapeutically active propanediol is isolated from the reaction mixture by diluting the mixture with water and acidifying. The ester usually precipitates from the mixture upon acidification. If not, it can be obtained by conventional extraction procedures. A preferred practice is to concentrate the reaction mixture prior to dilution.

The ammonium or metal salt of the ester is readily prepared by mixing acid ester with an equivalent amount of ammonium or metal hydroxide, carbonate or bicarbonate.

As already indicated, a salt of Formula 1 is the predominant and primary active chemotherapeutic agent in the compositions of the invention. It will be understood, however, that in addition to the salt represented by Formula 1 the compositions can contain a solid, water-soluble, substantially non-toxic medicinal carrier such as, for instance, lactose, sugar maltose, glucose, sucrose, and the like. Compositions containing such a carrier are particularly useful for administration to warm-blooded animals via their drinking water, for the carrier is beneficial in getting the animal to drink more water and it simplifies the preparation of an elixir. Furthermore, compositions suitable for preparing aqueous solutions may be prepared by combining the dry powdery acid ester and an equivalent quantity of a dry base such as potassium bicarbonate, sodium bicarbonate, calcium carbonate and calcium hydroxide, and, if desired, with a water-soluble carrier.

Clear neutral solutions of the compositions of this invention can be readily prepared. Such solutions are exceptionally well-suited for administration by various means to warm-blooded animals for the control of infectious diseases caused by either gram-negative or gram-positive organisms.

The water-soluble compositions of my invention can be dissolved in the drinking water of warm-blooded animals. Known amounts of powder, say, from ½% or less up to 10%, dissolved in a given volume of water can be given ad libitum to the animals to be treated. This mode of flock and heard treatment of infectious diseases of poultry and livestock is of special value both because of the ease of administration and from the fact that sick animals, though off feed, still consume drinking water. Thus, a chemotherapeutic agent provided in the feed is of no value to sick animals which are off feed, while that supplied in the drinking water is of benefit.

For intravenous administration, the clear neutral nontoxic water soluble solutions readily prepared by dissolving the compositions in water offer many advantages in the treatment of acute infectious processes. Aqueous solutions containing from 20 to 40% of a salt of Formula 1 are highly useful for this purpose but the concentration of the chemotherapeutic agent may vary over a wide range, preferably not less than about 5 to 10%. The compositions can be supplied as a stable, dry sterile powder which is easily and completely dissolved aseptically in sterile saline for injection. Or the compositions can be supplied as a dry power consisting of the acid ester and an equivalent quantity of sodium bicarbonate or calcium hydroxide.

The compositions of the invention may also be administrated as a drench containing from about 5 to about 60% of the active ingredient.

In order to better understand this invention reference should be had to the following illustrative examples:

EXAMPLE 1

*Preparation of the succinic acid half ester of (dl)-threo-1 - (p-methylsulfonyl phenyl)-2-(alpha-alpha-dichloroacetamido)-1,3-propanediol*

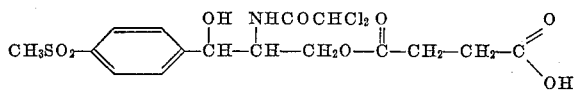

A mixture of 7.1 g. of (dl)-threo-1-(p-methylsulfonyl phenyl) - 2-(alpha,alpha-dichloroacetamido)-1,3-propanediol and 2.2 g. of succinic anhydride in 30 cc. of anhydrous pyridine is heated to 90° C. for 70 minutes. The solution is then concentrated under reduced pressure and the residue is dissolved in 50 cc. of water. The resulting solution is acidified by adding concentrated hydrochloric acid while stirring in an ice bath. The product separates as an oil and crystallizes on standing. The filtered and dried product melts 147–149° C. The product may be purified by suspending it in water and adding sodium bicarbonate until the pH is 7.5. The solution is filtered and the filtrate is acidified with dilute hydrochloric acid while cooling it in an ice bath. The product separates as crystals from the solution. This product melts 147–149° C. The product may be further purified by crystallization from acetonitrile and it melts at 150–152° C.

*Analysis.*—Calcd. for $C_{16}H_{19}Cl_2NO_8S$: C, 42.11, H, 4.20. Neut. equiv. 456. Found: C, 42.38, H, 4.31. Neut. equiv. 433.

The metal salts of this acid are prepared by stirring the acid with an equivalent amount of the appropriate metal hydroxide carbonate or bicarbonate until solution is complete. The solution may be used or the salt isolated by concentrating the solution.

EXAMPLE 2

*Preparation of the phthalic acid half ester of (dl)-threo-1 - (p - methylsulfonyl phenyl)-2-(alpha,alpha-dichloroacetamido)-1,3-propanediol*

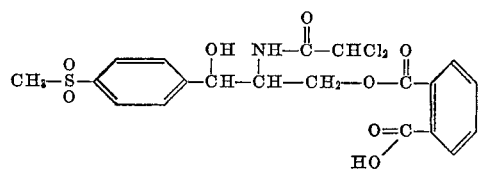

A solution of 3.5 g. of (dl)-threo-1-(p-methylsulfonyl phenyl) - 2-(alpha-alpha-dichloroacetamido) 1,3-propanediol and 1.5 g. of phthalic anhydride in 50 cc. of anhydrous pyridine is warmed to 65–70° for two hours. The resulting solution is diluted with 70 cc. of water and concentrated under reduced pressure until an oil separates. The solution is made acid with hydrochloric acid and a gum separates. This is dissolved in acetonitrile and the solution diluted with chloroform. Crystals separate and they may be recrystallized from water to give white crystals melting 130–131° C.

*Analysis.*—Calculated for: $C_{20}H_{19}Cl_2NO_8S$: N, 2.78; neutral equivalent 504. Found: N, 2.91; neutral equivalent 477.

The metal salts of this acid are prepared by treating the acid with an equivalent quantity of the metal hydroxide or the metal carbonate or bicarbonate in an aqueous suspension until solution is complete. The aqueous solution may be used, or the salt isolated by concentrating the solution.

EXAMPLE 3

*Preparation of succinic acid half ester of (dl)-threo-1- [p - (trifluoromethylsulfonyl) - phenyl]-2-(alpha,alpha-dichloroacetamido)-1,3-propanediol and salts*

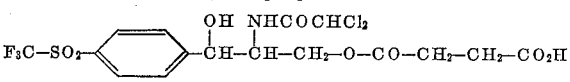

A mixture of 20.5 g. of (dl)-threo-1-[p-(trifluoromethylsulfonyl)phenyl] - 2 - (alpha,alpha-dichloroacetamido)-1,3-propanediol and 5.1 g. of succinic anhydride in 75 cc. of anhydrous pyridine is heated to 80° C. for one hour. The excess pyridine is then distilled off under reduced pressure and the residue slurried with water and made acid with hydrochloric acid. The product separates as a gum and may be induced to crystallize by scratching. The product may be purified by dissolving in aqueous bicarbonate, filtering off an insoluble material and reprecipitating with hydrochloric acid.

The product may be purified further by recrystallization from acetonitrile.

EXAMPLE 4

*Preparation of the glutaric acid half ester of (dl)-threo-1- (p - methylsulfamylphenyl) - 2 - (alpha,alpha - dichloroacetamido)-1,3-propanediol and salts*

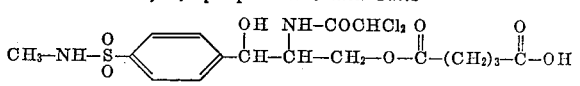

A solution of 37.1 g. of (dl)-threo-1-(p-methylsulfamylphenyl - 2 - (alpha,alpha - dichloroacetamido) - 1,3 - propanediol and 12 g. of glutaric anhydride in 100 cc. of pyridine is heated to 90° C. for 1½ hours. The excess pyridine is removed by distillation under reduced pressure, and the residue is stirred with 100 cc. of water and made acid by adding concentrated hydrochloric while it is kept cold. A gum separates. This is dissolved in aqueous bicarbonate and any insoluble residue is filtered off. The solution is made acid with hydrochloric acid and the product separates. It may be further purified by crystallization from ethylene chloride.

Salts of this acid are prepared by adding the acid to an equivalent amount of base in an aqueous medium.

EXAMPLE 5

*Preparation of the adipic acid half ester of (dl)-threo-1- (p - methylmercaptophenyl) - 2 - (alpha,alpha - dichloroacetamido)-1,3-propanediol and salts*

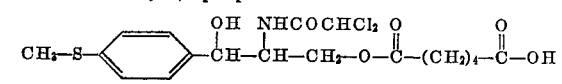

A mixture of 7.3 g. of adipic acid and 9.2 g. of adipyl chloride are stirred in 100 cc. of pyridine for 5 hours. To this solution one adds 32.4 g. of (dl)-threo-1-(p-methylmercaptophenyl) - 2 - (alpha,alpha - dichloroacetamido) - 1,3 - propanediol and heats the mixture at 80° C. for one hour. The excess pyridine is evaporated under reduced pressure and the residue mixed with 100 cc. of water. The solution is made acid with hydrochloric acid, and the product separates as an oil. The water is decanted off, and the residue stirred well with 100 cc. of water as sodium bicarbonate is added until the pH is 8. The bicarbonate solution is extracted several times with ethyl acetate and the aqueous layer is then made acid with hydrochloric acid. The product separates and is purified by crystallization from ethylene chloride.

Salts of this acid are prepared by adding the acid to an equivalent amount of base in an aqueous medium.

EXAMPLE 6

*Preparation of the succinic acid half ester of D(—)-threo-1 - (p-methylsulfonylphenyl) -2 - (alpha,alpha - dichloroacetamido)-1,3-propanediol and salts*

A mixture of 7.1 g. of D(—)-threo-1-p-methylsulfonylphenyl) - 2 - (alpha,alpha - dichloroacetamido) - 1,3 - propanediol and 2.2 g. of succinic anhydride in 70 cc. of anhydrous pyridine is stirred at 25° C. until solution is complete, and the mixture is allowed to stand at this temperature for two days. The excess pyridine is then removed by evaporation under reduced pressure. The residue is dissolved in water and acidified with concentrated hydrochloric acid. The product separates as a partially crystallized mass. It is separated from the solution, washed with a small amount of water and then dissolved in aqueous sodium bicarbonate. The bicarbonate solution is extracted with ethyl acetate. The aqueous solution is then cooled in an ice bath and the pH brought to 2 by the addition of concentrated hydrochloric acid. The product separates as crystals which may be purified further by crystallization from acetonitrile.

The desired salt of this acid may be prepared by suspending the acid in water, adding one equivalent of the appropriate base, stirring until solution is complete. The solution may be used as such or lyophilized to give the dried salt.

EXAMPLE 7

*Preparation of the sebacic acid half ester of (dl)-threo-1- (p - azidosulfonylphenyl) - 2 - (alpha,alpha - dichloroacetamido)-1,3-propanediol*

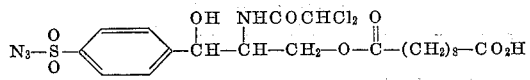

A mixture of 10.1 g. of sebacic acid and 12 g. of sebacyl chloride in 150 cc. of pyridine is stirred at 50° C. for 5 hours. To this solution is added 38.3 g. of (dl)-threo-1-(p - azidosulfonylphenyl) - 2 - (alpha,alpha - dichloroacetamido)-1,3-propanediol and the mixture heated to 80° C. for two hours. The excess pyridine is removed under reduced pressure, and the residue slurried with water and made acid with concentrated hydrochloric acid. A gum separates and this is decanted free of water and washed well with water. The gum is dissolved in water by adding sodium bicarbonate and the solution is extracted with ethyl acetate. The bicarbonate solution is slowly made acid with hydrochloric acid and the product separates from the solution. It may be purified by crystallization from ethylene chloride.

Salts are prepared from this acid by adding an equivalent amount of base in aqueous solution.

EXAMPLE 8

*Preparation of the succinic acid half ester of (dl)-threo-1- (p - sulfamylphenyl) - 2 - (alpha,alpha - dichloroacetamido)-1,3-propanediol and its salts*

A mixture of 9 g. of (dl)-threo-1-(p-fluorosulfonylphenyl) - 2 - (alpha,alpha - dichloroacetamido) - 1,3 - propanediol (U.S. 2,680,134), 2.8 g. of succinic anhydride and 250 mg. of anhydrous sodium succinate in 100 ml. of dioxane was refluxed for 18 hours. The reaction mixture was filtered and evaporated to dryness under reduced pressure, and the resulting pale yellow oil was dissolved in 50 ml. of dimethylformamide. Then, 3.75 of sodium azide was slowly added to the stirred solution and stirring was continued for 16 hours. The reaction mixture was then poured into one liter of water. The resulting solution was let stand for four days at room temperature and was filtered to remove some insoluble matter. It was next evaporated to dryness under reduced pressure leaving a colorless, viscous gel, which was treated with 125 ml. of ethanol. Some insoluble salt was filtered off and the filtrate was treated with 1 g. of sodium borohydride dissolved in 25 ml. of water. The reaction mixture was stirred for 75 min. at a temperature not exceeding 35° C.; then 4 ml. of acetone was added in order to decompose the excess sodium borohydride. A small amount of precipitated salt was filtered off and discarded, and the filtrate was evaporated to dryness under reduced pressure leaving an oil. This oil was treated with warm acetonitrile. Some insoluble salt was filtered off. On cooling, the filtrate yielded 2.3 g. of the sodium salt of the succinic acid half ester of (dl)-threo-1-(p-sulfamylphenyl)-2-(alpha,alpha-dichloroacetamido)-1,3-propanediol. It was very hygroscopic.

The infrared absorptions with their relative intensities are listed below.

The spectrum was determined on a potassium bromide pressed disc at 25° C. from 2 to 15 microns.

| Wavelength (microns): | Relative Intensities |
|---|---|
| 2.99 | strong. |
| 3.30 | weak. |
| 3.44 | medium. |
| 4.75 | weak. |
| 6.00 | very strong. |
| 6.40 | medium, shoulder. |
| 6.50 | strong. |
| 6.77 | weak. |
| 7.15 | strong. |
| 7.52 | do. |
| 8.40 | strong, broad. |
| 8.62 | medium, shoulder. |
| 8.90 | medium. |
| 9.10 | do. |
| 9.64 | strong, sharp. |
| 9.90 | do. |
| 10.95 | very weak, broad. |
| 11.70 | very weak, broad shoulder. |
| 12.32 | strong. |
| 14.05 | weak, broad. |

The examples have illustrated the products of this invention with certain specific compounds. However, the invention is generic to all the sulfur-containing compounds within the scope of Formula 1.

The Z of Formula 1 is a divalent aliphatic or aromatic group of 2–10 carbon atoms. It can be saturated or unsaturated, branched or straight-chained. It may be substituted with ester and ether groups provided of course the total number of carbon atoms does not exceed 10.

Specific examples of salts of the invention other than those already described include:

Sodium salt of succinic acid half ester of 1-(p-ethylsulfonylphenyl) - 2 - alpha,alpha - dichloroacetamido)-1,3-propanediol.

Potassium salt of acetoxysuccinic acid half ester of 1-p - hexylsulfonylphenyl) - 2 - (alpha,alpha - dichloroacetamido)-1,3-propanediol.

Ammonium salt of maleic acid half ester of 1-(p-chloromethylsulfonylphenyl) - 2 - (alpha,alpha - dichloroacetamido)-1,3-propanediol.

Magnesium salt of fumaric acid half ester of 1-(p-dibromoethylsulfonylphenyl) - 2 - (alpha, alpha - dichloroacetamido)-1,3-propanediol.

Calcium salt of glutaric acid half ester of 1-(p-methylsulfinylphenyl) - 2 - (alpha,alpha - dichloroacetamido)-1,3-propanediol.

Sodium salt of citraconic acid half ester of 1-(p-ethyl-sulfamylphenyl) - 2 - (alpha,alpha - dichloroacet-amido)-1,3-propanediol.

Ammonium salt of mesaconic acid half ester of 1-(p-di-n - amylsulfamylphenyl) - 2 - (alpha,alpha - dichloro-acetamido)-1,3-propanediol.

Sodium salt of itaconic acid half ester of 1-[p-(2-meth-oxyethylsulfonyl)phenyl] - 2 - (alpha,alpha - dichloroacetamido)-1,3-propanediol.

Sodium salt of camphoric acid half ester of 1-(2-ethyl-4 - dimethylsulfamylphenyl) - 2 - (alpha,alpha - dichloroacetamido)-1,3-propanediol.

Sodium salt of phthalic acid half ester of 1-(2-bromo-4 - dimethylsulfamylphenyl) - 2 - (alpha,alpha - dichloroacetamido)-1,3-propanediol.

Sodium salt of isophthalic acid half ester of 1-(3-chloro-4 - dimethylsulfamylphenyl) - 2 - (alpha,alpha - dichloroacetamido)-1,3-propanediol.

Ammonium salt of terphthalic acid half ester of 1-(2-fluoro - 4 - sulfamylphenyl) - 2 - (alpha,alpha - dichloroacetamido)-1,3-propanediol.

Potassium salt of naphthalic acid half ester of 1-(2-ethoxy - 4 - sulfamylphenyl) - 2 - (alpha,alpha - dichloroacetamido) - 1,3 - propanediol.

Compositions containing sodium salt of the succinic acid half ester of (dl)-threo-1-(p-methylsulfonylphenyl)-2-(alpha,alpha-dichloroacetamido)-1,3-propanediol are especially useful. Such a composition administered in the drinking water provides warm-blooded animals both prophylactic and curative action on Salmonella, Vibrio, Rickettsial and pleuropneumonia infections. Infections caused by such organisms as *Diplococcus pneumoniae, Klebsiella pneumoniae,* and *Salmonella typhimurium* can be controlled.

This application is a continuation-in-part of U.S. Application Serial No. 442,184, filed July 8, 1954, now bandoned.

The embodiments of the invention in which an exclusive property or privilege is claimed are defined as follows:

1. A water-soluble, therapeutically active, powdery composition comprising a compound of the formula

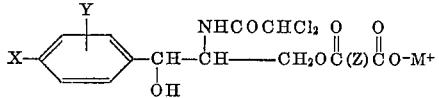

where X is a sulfur-containing group of the class consisting of lower alkylsulfonyl, halogenoalkylsulfonyl containing 1 to 2 carbon atoms, lower alkylsulfinyl, lower alkylmercapto, azidosulfonyl, sulfamyl, mono lower alkylsulfamyl and di lower alkylsulfamyl groups, Y is a member of the class consisting of hydrogen, halogen, lower alkyl and lower alkoxy; Z is a divalent organic radical having from 2 to 10 carbon atoms selected from the group consisting of alkylene, alkenylene and arylene radicals, said divalent organic radicals having as constituents of the linking chain only carbon and hydrogen, the substituents on said linking chain being selected from the group consisting of hydrogen, alkoxy and acyloxy radicals; and M is a member of the class consisting of ammonium, sodium, potassium, magnesium and calcium and a non-toxic, pharmaceutically-acceptable carrier.

2. A water-soluble, therapeutically active, powdery composition comprising the sodium salt of the succinic acid half ester of (dl)-threo-1-(p-methylsulfonylphenyl)-2-(alpha,alpha-dichloroacetamido)-1,3-propanediol and a non-toxic, pharmaceutically-acceptable carrier.

3. A water-soluble, therapeutically active, powdery composition which comprises the sodium salt of the succinic acid half ester of (dl)-threo-1-(p-sulfamylphenyl)-2 - (alpha,alpha - dichloroacetamido) - 1,3 - propanediol and a non-toxic, pharmaceutically-acceptable carrier.

4. A water-soluble, therapeutically active, powdery composition comprising the sodium salt of the succinic acid half ester of (dl)-threo-1-[p-(trifluoromethylsulfonyl)-phenyl] - 2 - (alpha,alpha - dichloroacetamido) - 1,3-propanediol and a non-toxic, pharmaceutically-acceptable carrier.

5. A compound of the formula

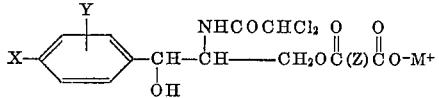

where X is a sulfur-containing group of the class consisting of lower alkylsulfonyl, halogenoalkylsulfonyl containing 1 to 2 carbon atoms, lower alkylsulfinyl, lower alkylmercapto, azidosulfonyl, sulfamyl, mono lower alkylsulfamyl and di lower alkylsulfamyl groups, Y is a member of the class consisting of hydrogen, halogen, lower alkyl and lower alkoxy; Z is a divalent organic radical having from 2 to 10 carbon atoms selected from the group consisting of alkylene, alkenylene and arylene radicals, said divalent organic radicals having as constituents of the linking chain only carbon and hydrogen, the substituents on said linking chain being selected from the group consisting of hydrogen, alkoxy and acyloxy radicals; and M is a member of the class consisting of ammonium, sodium, potassium, magnesium and calcium.

6. The sodium salt of the succinic acid half ester of (dl) - threo - 1 - (p - methylsulfonylphenyl) - 2-(alpha,alpha - dichloroacetamido) - 1,3 - propanediol.

7. The sodium salt of the succinic acid half ester of (dl) - threo - 1 - (p - sulfamylphenyl) - 2 - (alpha,alpha-dichloroacetamido)-1,3-propanediol.

8. The sodium salt of the succinic acid half ester of (dl) - threo - 1 - [p - (trifluoromethylsulfonyl) - phenyl]-2-(alpha-alpha-dichloroacetamido)-1,3-propanediol.

References Cited in the file of this patent

UNITED STATES PATENTS

| | | |
|---|---|---|
| 2,562,107 | Long | July 24, 1951 |
| 2,586,661 | Jacob et al. | Feb. 19, 1952 |
| 2,680,120 | Gregory | June 1, 1954 |
| 2,680,135 | Gregory | June 1, 1954 |
| 2,815,359 | Gregory | Dec. 3, 1957 |
| 2,816,915 | Gregory | Dec. 17, 1957 |
| 2,852,432 | Goebel | Sept. 16, 1958 |

FOREIGN PATENTS

| | | |
|---|---|---|
| 512,433 | Belgium | July 15, 1952 |

UNITED STATES PATENT OFFICE
CERTIFICATE OF CORRECTION

Patent No. 2,988,481                           June 13, 1961

Walter A. Gregory

It is hereby certified that error appears in the above numbered patent requiring correction and that the said Letters Patent should read as corrected below.

Column 2, line 43, after "carbonate." insert -- Especially preferred is the sodium salt. --; column 5, line 16, for "-1-p-methylsulfonyl-" read -- -1-(p-methylsulfonyl- --; column 6, line 62, for "-2-alpha,alpha-" read -- -2-(alpha,alpha- --; line 65, for "p-hexylsulfonylphenyl)-" read -- (p-hexylsulfonylphenyl)- --; column 7, lines 37 and 38, for "bandoned" read -- abandoned --.

Signed and sealed this 14th day of November 1961.

(SEAL)
Attest:

ERNEST W. SWIDER                           DAVID L. LADD
Attesting Officer                              Commissioner of Patents